United States Patent [19]

Eckenrode

[11] Patent Number: 5,023,759
[45] Date of Patent: Jun. 11, 1991

[54] VEHICLE HEADLIGHT POSITION ADJUSTMENT ASSEMBLY

[75] Inventor: Robert T. Eckenrode, North Canton, Ohio

[73] Assignee: Eaton Corporation, Cleveland, Ohio

[21] Appl. No.: 586,657

[22] Filed: Sep. 24, 1990

[51] Int. Cl.$^5$ .......................................... F21V 21/00
[52] U.S. Cl. ..................... 362/66; 362/273; 362/289; 74/25; 74/606 R
[58] Field of Search ............. 362/66, 69, 289, 273, 362/421; 74/25, 89.15, 606 R

[56] References Cited

U.S. PATENT DOCUMENTS

| | | |
|---|---|---|
| 4,665,469 | 5/1987 | Furfari et al. ...................... 74/25 X |
| 4,703,399 | 10/1987 | Van Duyn et al. ................... 362/66 |
| 4,713,739 | 12/1987 | Ryder et al. ..................... 362/289 X |
| 4,843,523 | 6/1989 | Nakamura ............................ 362/69 |

Primary Examiner—Stephen F. Husar
Attorney, Agent, or Firm—A. E. Chrow

[57] ABSTRACT

A vehicle headlight position adjustment assembly is provided that in a preferred embodiment (100) has a rotary input member (8) that upon rotation causes a threaded output adjustment member (6) to transverse axially through openings (34) and (34') in opposite side walls of first housing part (2) of a two part housing. The second part (4) or cover for the housing includes at least one pedestal (44) and preferably two spaced-apart pedestals (44) and (44') having apertures therethrough through which output member 6 extends enabling the pedestals to hold housing parts 2 and 4 together in the event that they become detached from each other.

8 Claims, 2 Drawing Sheets

VEHICLE HEADLIGHT POSITION ADJUSTMENT ASSEMBLY

This invention relates generally to an assembly for adjusting the position of a vehicular headlight and more particularly to an improvement for the gear box type vehicular headlight position assembly in which rotation of a rotary input member is operative to move a threaded output adjustment member axially in opposite directions to effect the particular positioning desired.

BACKGROUND OF THE INVENTION

Gear box type vehicle headlamp position adjusters have lately become of importance for they enable right angle and other angular relationships to exist between the rotary input and the output adjustment member which is of great advantage in modern automobile design that often involves complex arrangements and/or confined space rendering the use of conventional singular vehicle headlight position adjustment screws different if not impossible.

Examples of two such gear box type headlight position adjusters are respectively disclosed in U.S. Pat. Nos. 4,665,469 and 4,796,494, assigned to the assignee of this invention and the disclosures of which are incorporated herein by reference.

Another example of a gear box headlight position assembly is disclosed in U.S. Pat. No. 4,703,399 and a most recent example is disclosed in U.S. Pat. No. 4,939,946, the disclosures of both of which are incorporated herein by reference.

Although the present invention includes gear box assemblies having output adjustment members that rotate, it particularly addresses the type of gear box in which the output and adjustment member moves axially without rotation in response to rotation of the input member and the means by which the output member is prevented from rotating and even more particularly to the gear box housing itself which characteristically features a top (cover) and a bottom that are detachable from each other to enable assembly, replacement and repair of the components within that enable conversion from rotary input motion to axial output motion.

The detachability between the gear box housing cover and bottom creates the risk of separation or loss of most often the cover from the bottom and may result in contamination, loss or damage to one or more of the components within the gear box housing.

The present invention provides a solution to the problem by providing means for holding the gear box housing parts together in the event that they become detached from each other and, for those assemblies in which the output member is prevented from rotating, the invention is adaptable to provide additional means for preventing the output adjustment member from rotating as it moves in opposite axial direction in response to rotation of the rotary member.

SUMMARY OF THE INVENTION

Accordingly, it is an object of this invention to provide an improved gear box headlight position adjuster assembly that is provided with means for holding the gear box housing parts together in the event that they become detached from each other.

It is another object of this invention to provide an improved gear box headlight position adjustment assembly that is provided with means for holding the gear box housing parts together in the event that they become detached from each other in combination with means for preventing the output adjustment member from rotating as it moves axially in response to rotation of the input member.

DESCRIPTION OF SOME PREFERRED EMBODIMENTS

Figure 1:
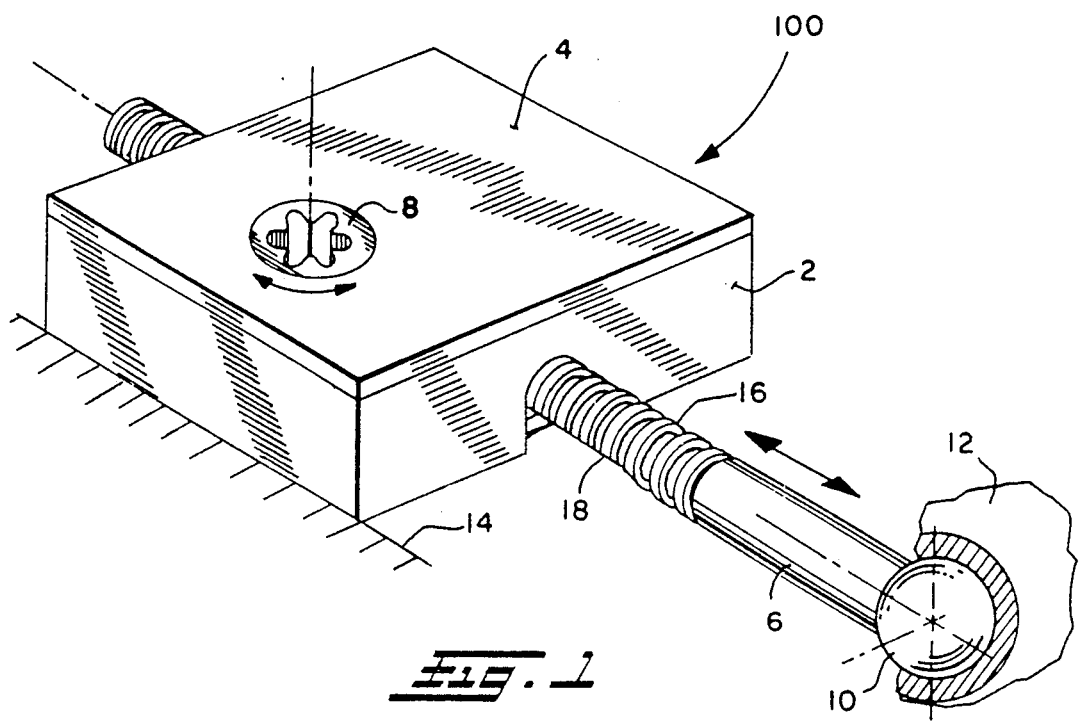
FIG. 1 is a perspective view of an embodiment of the gear box assembly of the invention.

A preferred embodiment for a vehicle headlight position adjustment assembly 100 is shown in FIG. 1. Assembly 100 has a two part gear box housing comprising a first (lower) part 2 and a second (upper cover) part 4. Parts 2 and 4 are attached to each other by any suitable means including snaps and other types of fasteners.

Assembly 100 is secured to a fixed frame on vehicle denoted by reference numeral 14.

Assembly 100 includes a rotary input member 8 that is operatively connected to a threaded output adjustment member 6 such that member 6 is caused to move in opposite axial direction in response to rotation of member 8 in opposite directions as shown by the arrows.

Adjustment member 6 is of the type that is prevented from rotation as it moves axially and thus includes a flat surface 18 along its length for a distance sufficient to enable member 6 to traverse the axial distance to effect the desired positioning of the headlight.

Member 6 is operatively connected to movable frame 12 upon which the vehicle headlight is mounted so that axial movement of member 6 operative to move frame 12 and the headlight. Preferably, the end of member 6 is shaped into a spherical ball 10 that engages a suitable cup or the like secured to frame 12 to enable a pivotal action to occur as member 6 moves axially in opposite directions.

Figure 2:
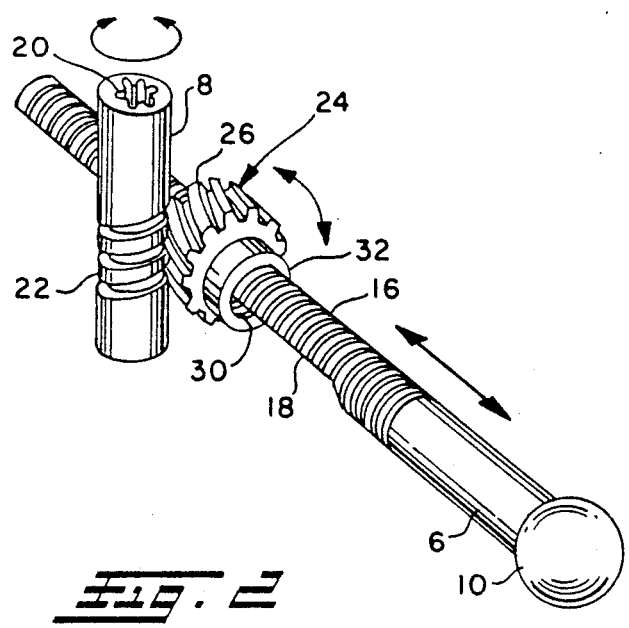
FIG. 2 is a perspective view of components contained within the gear box of FIG. 1.

The components within the gear box housing of FIG. 1 are shown in FIG. 2 in which rotary input member 8 is provided with means such as a starred or phillips impression 20 to enable one to use a tool to rotate member 8.

Member 8 is a worm having threads 22 that mesh with threads 26 of worm gear 24 that is disposed coaxially about member 6 and has internal threads 30 that threadingly engage threads 16 of member 6 such that rotation of worm 8 causes worm gear 24 to rotate about member 6 and cause member 6 to move axially due to the engagement between threads 16 and 30.

In applications where adjustment member 6 is permitted to rotate, intermediate worm gear 24 would not be required as then, they could be a direct engagement between the threads of worm 8 and member 6.

Figure 3:
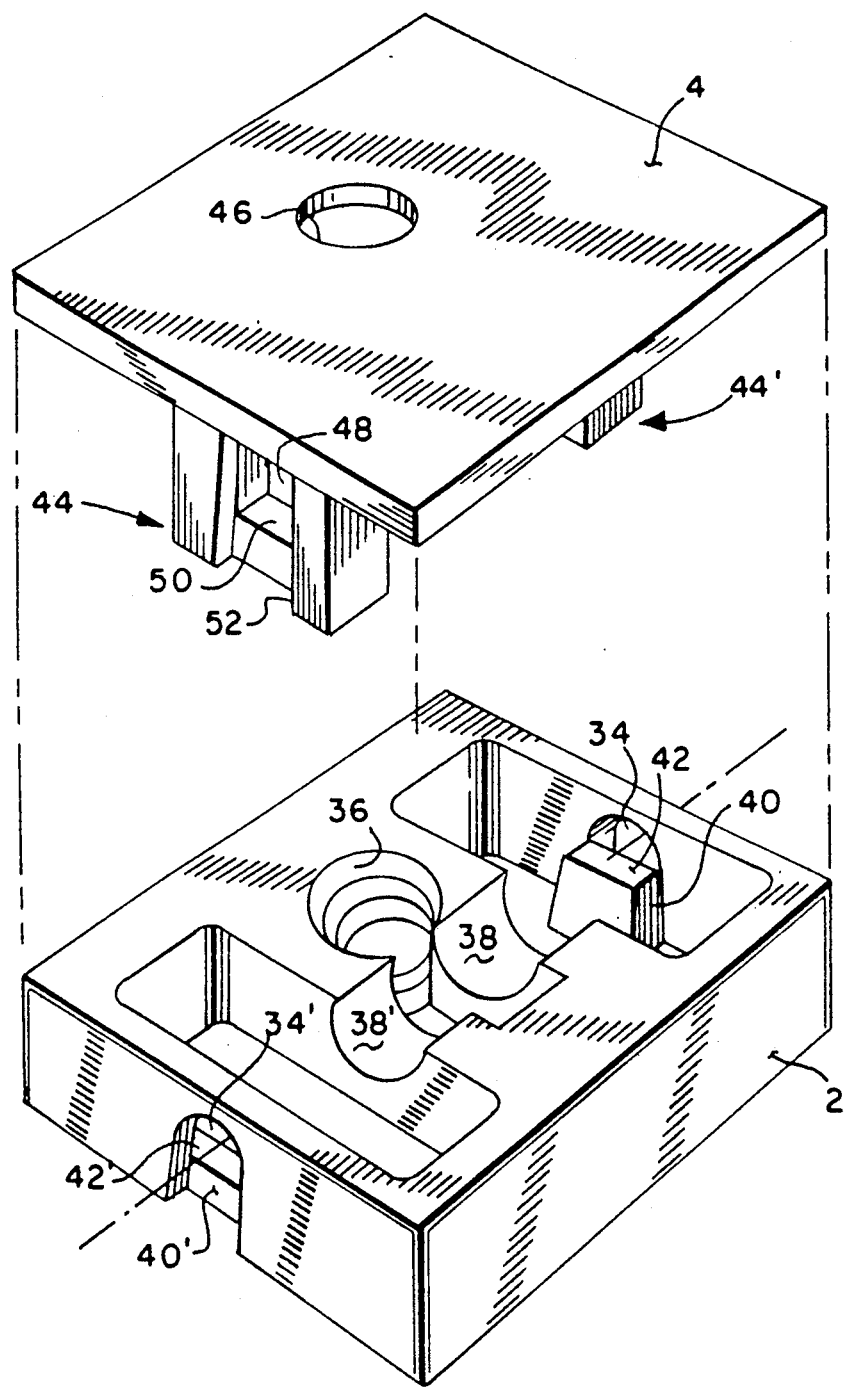
FIG. 3 is an exploded perspective view of the gear box housing of FIG. 1.

In FIG. 3, the gear box housing of assembly 100 is shown in a detailed form for convenience. First part 2 has substantially axially aligned openings 34 and 34' through which member 6 traverses in opposite axial directions. First part 2 of the gear box housing has a cavity 36 for receiving worm 8 and has a pair of spaced apart cradle surfaces 38, 38' for rotationally supporting bearing hub surfaces 32 of worm gear 24 (only one shown in FIG. 2).

Second gear box housing part 4 has an opening 46 therethrough to enable access to worm 8 as shown in FIG. 1. Part 4 also has at least one pedestal 44 and preferably two spaced-apart pedestals 44 and 44' that extend away therefrom as shown in FIG. 3.

Pedestal 44 has an aperture 48 therethrough that is in substantial axial alignment with openings 34 and 34' when housing part 4 is attached to housing part 2. When two pedestals are employed, they both have apertures therethrough that are in substantial axial alignment with each other and with openings 34 and 34'.

Thus, when gear box housing part 4 is attached to housing part 2 with adjustment member 6 extending through side openings 34 and 34' and through one and preferably through two pedestal apertures 48, (only one shown in FIG. 3), housing parts 2 and 4 will be held together should they become detached for output member 6 being held in openings 34 and 34' by the side walls of part 2 will hold part 4 to housing part 2 which is of great advantage for reasons previously described.

Also shown in FIG. 3 for gear box assemblies of the type that feature a non-rotating output member such as member 6 is that a portion of at least one and preferably both of openings 34 and 34' has a flat edge 42, 42' extending thereacross that is slidingly engaged by flat surface 18 of output member 6 and operative to prevent member 6 from rotating as it traverses axially in opposite directions through openings 34, 34'.

Preferably flat edges 42 and 42' are provided by a protuberance such as protuberances 40 and 40' that extend from the respective opposite side walls of housing part 4 towards pedestals 44 and 44' when housing part 2 is attached to housing part 4. In such instances, the side of pedestals 44 and 44' (if two are employed) facing towards protuberances 40 and 40' preferably include a slot such as slot 52 that is adapted to receive at least a portion of protuberance 40; thereinto and, when a second pedestal 44' is included, the slot in the side of pedestal 42' is adapted to receive at least a portion of protuberance 40 thereinto.

As shown in FIG. 3, when output adjustment member 6 is a non-rotating member, the periphery about aperture 48 of pedestal 40 and (when two pedestals are employed) the apertures through at least one of pedestals 44 and 44' preferably include a flat portion 50 that like flat edges 42 and 42' are slidingly engaged by the flat surface on output member 6 and cooperate therewith as additional means for preventing member 6 from rotating as it traverses axially in opposite directions in response to rotation of the rotary input of the rotary input member such as worm 8 in opposite directions.

Although gear box housing parts 2 and 4 may be made from any material suitable for vehicle headlight position adjustment, they are preferably molded from a suitable plastic material.

What is claimed is:

1. An improved vehicle headlight position adjustment assembly of the type having an elongate threaded output adjustment member that extends through substantially axially aligned openings through opposite sides of a first part of a detachable two part gear box housing, said gear box housing including a rotary input member operative to cause the output adjustment member to move in opposite axial directions in response to rotation of the input member in opposite directions, and said improvement characterized by said gear box housing second part having at least one pedestal extending therefrom having an aperture therethrough that is in substantial axial alignment with the gear box housing first part openings and is adapted to receive the output adjustment member therethrough when the first and second gear box housing parts are attached together enabling said pedestal to hold the gear box first and second housing parts together in the event that they become detached from each other.

2. The assembly of claim 1 wherein the gear box housing second part has two of the pedestals disposed in spaced-apart relationship to each other with their respective apertures substantially axially aligned with each other and with the gear box housing first part opposite side openings for receiving the output adjustment therethrough when the gear box housing first and second parts are attached together.

3. The assembly of claim 1 or 2 wherein the gear box housing first part opposite sides are adapted to provide a flat edge across the respective openings therethrough and the output adjustment member includes a flat surface that is operative to slidingly engage the flat edge across the gear box housing first part openings and cooperate therewith to prevent the output adjustment member from rotating as the output adjustment member moves in opposite axial directions through the pedestal aperture and the gear box housing first part openings in response to rotation of the rotary input member.

4. The assembly of claim 3 wherein the periphery about the pedestal aperture includes a flat portion that is slidingly engaged by the adjustment member flat surface and cooperates therewith in combination with the opening flat edges to prevent the adjustment member from rotating in response to rotation of the rotary input member.

5. The assembly of claim 3 wherein the flat edge across at least one of the gear box housing first part side openings is part of a protuberance that extends from the side towards the pedestal when the gear box housing first and second parts are attached together.

6. The assembly of claim 5 wherein the side of the pedestal facing towards the protuberance includes a slot adapted to receive at least a portion of the protuberance thereinto.

7. The assembly of claim 4 wherein the flat edge across at least one of the gear box housing first part side openings is part of a protuberance that extends from the side towards the pedestal when the gear box housing first and second parts are attached together.

8. The assembly of claim 7 wherein the side of the pedestal facing towards the protuberance includes a slot adapted to receive at least a portion of the protuberance thereinto.

* * * * *